United States Patent [19]

McHenry et al.

[11] 4,322,395

[45] Mar. 30, 1982

[54] PROCESS FOR THE PRODUCTION OF ALUMINUM NITRIDE NEEDLES

[75] Inventors: Kelly D. McHenry, Eden Prairie; Jane M. Smeby; Robert H. Michelson, both of Minneapolis, all of Minn.

[73] Assignee: Honeywell Inc., Minneapolis, Minn.

[21] Appl. No.: 266,853

[22] Filed: May 26, 1981

[51] Int. Cl.³ ............................................. C01B 21/072
[52] U.S. Cl. ...................................... 423/412; 501/95; 264/DIG. 19
[58] Field of Search .................. 423/409, 412; 501/95; 264/DIG. 19

[56] References Cited

PUBLICATIONS

Taylor, R. M. et al. "Journ. of the Electro Chem. Soc." Apr. 1960, pp. 308–314.
"Chem Abst." vol. 89; 1978; 93601x.

*Primary Examiner*—G. O. Peters
*Attorney, Agent, or Firm*—Omund R. Dahle

[57] ABSTRACT

A process for fabricating aluminum nitride needles, the process utilizing moderate furnace temperatures (950° C.–1000° C.) and low toxicity reactants (i.e. $NH_3$ and Al). Argon gas and ammonia gas are mixed and flowed over the heated aluminum and the aluminum nitride needles grow at the upstream end of the hot zone of the furnace.

9 Claims, 2 Drawing Figures

PROCESS FOR THE PRODUCTION OF ALUMINUM NITRIDE NEEDLES

BACKGROUND AND SUMMARY OF THE INVENTION

The field of the invention is in an improved process for producing aluminum nitride needles and particularly a process using moderate temperatures (950°–1000° C.) and inexpensive, low toxicity reactants (i.e. $NH_3$ & $Al°$) for the production of the AlN needles.

In the prior art several methods have been used for the production of AlN needles. In one of these processes such as is shown in U.S. Pat. No. 3,653,830 there is taught the heating of a mixture of aluminum nitride powders and aluminum powders to 580°–1000° C. in an atmosphere consisting of nitrogen or ammonia gas with additions of halogens which create an exothermic nitrification of aluminum heating the charge to above 2000° C. and forming aluminum nitride fibers. While this may appear attractive from an economic point of view, the very high toxicity of the halogens needed in the reaction preclude their use because of the need for special handling and equipment.

Another prior art method of producing AlN needles involves the reduction of $Al_2O_3$ with carbon in an atmosphere of nitrogen at 1600°–1700° C. While there are attractive aspects to this process $Al_2O_3(s) + 3C°(s) \rightarrow 2AlN_{(s)} + 3CO(g)$ because all the reaction products are gases except for the AlN, the temperatures required are sufficiently high to make the process industrially unfeasible.

In the present invention the process uses a common low cost tube furnace with an inexpensive ceramic boat as the reaction container. The ceramic boat is charged with aluminum powder and placed within the tube furnace so that one end of the boat is at the leading upstream end of the hot zone of the furnace. Ammonia and argon are mixed and introduced into the tube and at operating temperature of 950°–1000° C. the reaction proceeds smoothly, the argon being a carrier for the ammonia to retard the reaction and allow the needles the necessary time to grow.

DESCRIPTION

In the related Koepke and McHenry U.S. Pat. No. 4,256,792 entitled "Composite Electronic Substrate of Alumina Uniformly Needled Through With Aluminum Nitride", and assigned to the same assignee as the present invention, there is described an alumina-aluminum nitride composite substrate for micropackage assembly having anisotropic thermal properties. This composite dielectric ceramic substrate structure comprises a matrix of alumina ($Al_2O_3$) containing aluminum nitride (AlN) needle like elements distributed throughout the substrate and the needles aligned parallel to the short transverse dimension of the substrate. Since the aluminum nitride has a thermal conductivity about 10 times that of the alumina, the needles serve as solid state heat pipes to dissipate heat away from the microcircuitry. In the present invention there is described an improved and more simple process for producing these AlN needles. The needle configuration with optimum characteristics is one with small cross sectional area and a length to diameter ratio of at least ten to one. Since it is necessary to thermally isolate one component in an integrated circuit from another, the cross sectional area of a needle must not be so large as to allow heat flow through the surface from one component to another. The greater length is required because the needle must reach through the substrate from one side to the other so that heat picked up on one end will be transferred to the other end where it will then be removed.

Figure 1:
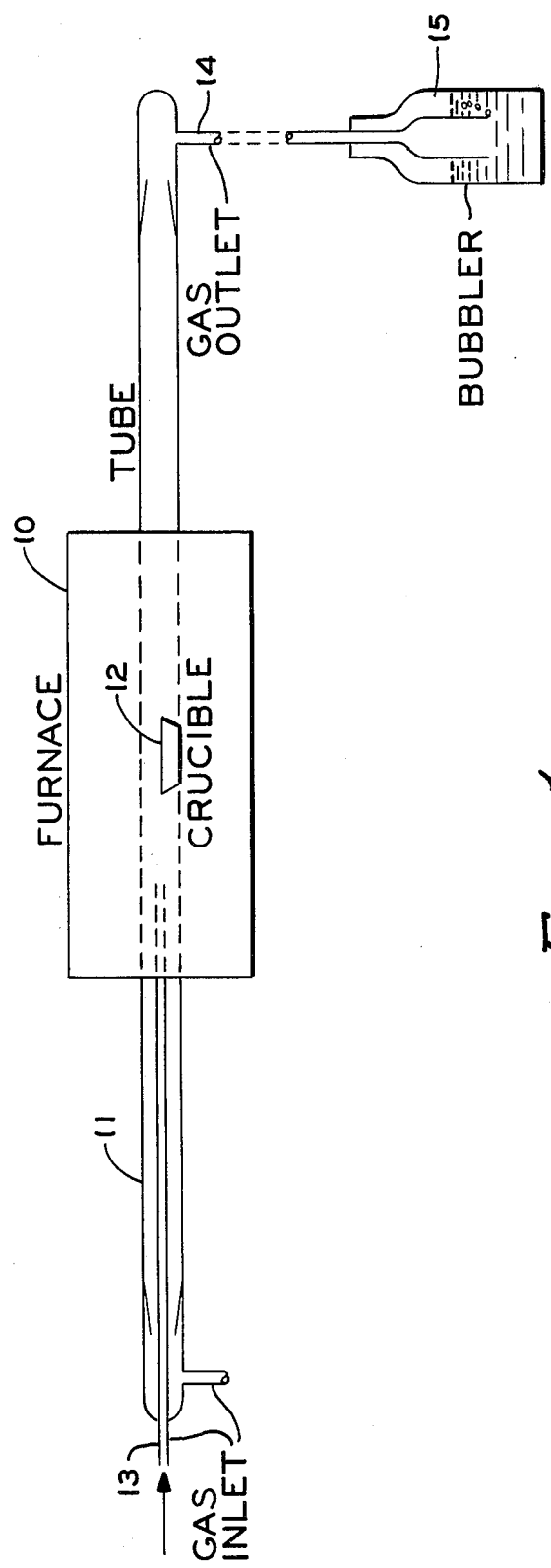
FIG. 1 is a diagrammatic representation of the tube furnace containing the ceramic boat or crucible used in the process of the invention.

Referring now to FIG. 1 there is disclosed a metallurgical furnace such as a common tube furnace 10. One such furnace is made by Lindberg Corporation of Chicago, Illinois. The furnace includes an elongated mullite tube 11 with a ceramic boat or crucible 12 as the reaction container. One or more gas inlets 13 allow the introduction of the desired gases, here a mixture of argon and ammonia. At the right end of the tube 10 a gas outlet 14 is led into a bubbler 15.

A key to the process is in the use of argon gas as a carrier for the ammonia gas. Without the argon to retard the reaction, the reaction proceeds far too quickly to allow the needles the necessary time to grow. The result is AlN powder and not needles. The argon provides a means to allow the reaction to occur at atmospheric pressures while keeping the concentration of ammonia at a level low enough to allow the formation of needles. The reaction is run in a pure $Al_2O_3$ boat charged with aluminum powder (−325 mesh). The boat is then placed in such a way as to have one end at the leading, upstream end of the hot zone of the furnace. It has been our observation that the needles prefer to grow upstream from the hot zone. A needle can grow lengthwise only if the rate of depositing molecules is greater on the ends than on the sides. In light of this, it is necessary to have a high carrier rate to avoid the formation of stunted or thick-set needles. This fact makes possible a method of changing the aspect ratio (length to diameter) of the needles to a desired configuration. A typical size of interest for individual needles may be about 2 mm long and about 0.2 mm in diameter. Increasing or decreasing the proportion of argon to ammonia will lengthen or shorten the needles, respectively, up to a point. Obviously, if no ammonia is added, nothing will form and if too much is added only powder will result. The ammonia and argon are mixed prior to their introduction into the tube. Typical rates are 45cc/min of argon and 5cc/min of ammonia for the production of needles having an aspect ratio of about 10:1. As pointed out deviations in the ratio of the gases and flow rates tends to change the aspect ratio. It should be pointed out that the size, shape, and quality of the needles is dependent on the rate of gas flow over the molten aluminum. The rates given here are for a tube with a 1 -$\frac{1}{8}$" inside diameter. Because there is a larger volume to move, a larger tube will have to have a proportionately faster gas flow rate. Once operating temperature has been reached (950°–1000° C.), the reaction proceeds smoothly to completion in ∼½hour. Reaction rate is typically 2 gms. conversion per hour. This can be increased by using higher flow rates.

EXAMPLE 1

Procedure for Producing AlN Needles

There was placed 8 grams of powdered aluminum (−325 mesh) in a boat of aluminum oxide (AL$_2$O$_3$) in a mullite tube furnace of 2½" inside diameter, such as manufactured by Lucifer Furnaces, Inc. of Warrington, Pennsylvania. The filled boat was placed in the tube furnace in such a position that one end of the boat is at the leading, upstream end of the hot zone of the furnace. The furnace was sealed with end caps in order to assure that outside atmosphere did not enter the chamber. The furnace was purged with argon for ½ hour prior to turning on the furnace to make sure no oxygen remained in the furnace. A typical flow rate of Ar is 150cc/min. When the furnace reached 500° C., the ammonia was added at a rate of about 50cc/min to an argon flow of about 150cc/min. Hold furnace at about 700° C. for 1 hour and then raise temperature. Once operating temperature has been reached (∼950° C.–1000° C.) the reaction proceeds smoothly.

Figure 2:
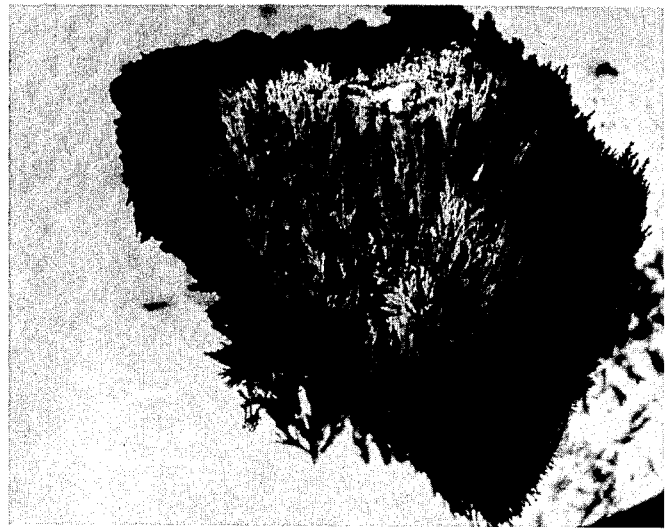
FIGS. 2 and 3 are photomicrographs of the aluminum nitride needle cluster as grown.
Figure 3:

In the growth process of the AlN needles it is presently hypothesized that the aluminum melts and grows upstream into a branching form as shown in the photomicrographs of FIGS. 2 and 3. The actual compound shown in these figures is AlN, not aluminum. The aluminum nitride grows upstream because the ammonia and the carrier gas provide a "mobile heat sink" for the aluminum. The gas removes sufficient heat from the molten aluminum to allow it to solidify as long as the aluminum is not in the hot zone of the furnace, and apparently the path of least resistance for the aluminum nitride is in forming new branches. This may explain the large amount of branching found in finished runs.

The embodiments of the invention in which an exclusive property or right is claimed are defined as follows:

1. A process for fabricating aluminum nitride needles comprising the steps of:
   providing aluminum powder in a crucible;
   providing a gas mixture of argon and ammonia;
   placing the crucible containing the aluminum powder in a metallurgical furnace so that one end of the crucible is upstream from the furnace hot zone;
   heating said aluminum powder to a temperature between about 950° C. and about 1000° C. and flowing said gas mixture through said metallurgical furnace and across said crucible so that aluminum nitride needles grow upstream of the furnace hot zone.

2. The process according to claim 1 wherein the furnace is a tube furnace.

3. The process according to claim 2 wherein the inside diameter of the tube is about 1⅛ inches.

4. The process according to claim 3 wherein the ratio of argon gas to ammonia gas in the mixture is about 9 to 1.

5. The process according to claim 3 wherein the flow rates are about 45cc/min of argon and about 5cc/min of ammonia.

6. The process according to claim 1 wherein the crucible is alumina (Al$_2$O$_3$).

7. The process according to claim 2 wherein the inside diameter of the furnace is about 2½ inches.

8. The process according to claim 7 wherein the flow rates are about 150cc/min of argon and about 50cc/min of ammonia.

9. The process according to claim 1 wherein the aluminum powder is rated as −325 mesh.

* * * * *